United States Patent
Fan et al.

(10) Patent No.: US 9,897,338 B2
(45) Date of Patent: Feb. 20, 2018

(54) COORDINATED AIR-SIDE CONTROL OF HVAC SYSTEM

(71) Applicant: Carrier Corporation, Farmington, CT (US)

(72) Inventors: Junqiang Fan, Glastonbury, CT (US); Sheng Li, Shanghai (CN); Stevo Mijanovic, South Windsor, CT (US); Anthony Sari, Lyons (FR); Olivier Josserand, La Boisse (FR)

(73) Assignee: CARRIER CORPORATION, Farmington, CT (US)

( * ) Notice: Subject to any disclaimer, the term of this patent is extended or adjusted under 35 U.S.C. 154(b) by 693 days.

(21) Appl. No.: 14/386,479

(22) PCT Filed: Mar. 8, 2013

(86) PCT No.: PCT/US2013/030058
§ 371 (c)(1),
(2) Date: Sep. 19, 2014

(87) PCT Pub. No.: WO2013/142105
PCT Pub. Date: Sep. 26, 2013

(65) Prior Publication Data
US 2015/0057811 A1 Feb. 26, 2015

Related U.S. Application Data

(60) Provisional application No. 61/613,897, filed on Mar. 21, 2012.

(51) Int. Cl.
*F24F 11/00* (2006.01)
*G05B 19/05* (2006.01)
*G05D 7/06* (2006.01)

(52) U.S. Cl.
CPC ........ *F24F 11/0009* (2013.01); *F24F 11/008* (2013.01); *F24F 11/0079* (2013.01);
(Continued)

(58) Field of Classification Search
None
See application file for complete search history.

(56) References Cited

U.S. PATENT DOCUMENTS 3,568,760 A 3/1971 Hogel
4,215,408 A 7/1980 Bitterli et al.
(Continued)

FOREIGN PATENT DOCUMENTS

CN 101769575 A 7/2010
EP 2256424 A2 12/2010

OTHER PUBLICATIONS

International Search Report and Written Opinion for application PCT/US2013/030058, dated Jul. 23, 2013, 10 pages.
(Continued)

*Primary Examiner* — Isaac T Tecklu
(74) *Attorney, Agent, or Firm* — Cantor Colburn LLP

(57) ABSTRACT

A method and apparatus for controlling an HVAC system. The method may include receiving a fan speed signal from a fan control loop, and choosing among an independent mode, a first linked mode, and a second linked mode, depending on the fan speed signal. The method may also include providing a signal to a pressure control loop to reduce a speed of a supply air fan of an AHU, when the first linked mode is chosen. The method may further include providing a signal to a temperature control loop to decrease a speed of a heat exchange wheel, to decrease a flow rate of a heat exchange fluid to an evaporator coil, or both, when the second linked mode is chosen. The method may additionally include allowing the fan control loop to operate indepen-
(Continued)

dently of the temperature and pressure control loops, when the independent mode is chosen.

20 Claims, 3 Drawing Sheets

(52) U.S. Cl.
CPC ......... *G05B 19/052* (2013.01); *G05D 7/0617* (2013.01); *F24F 2011/0038* (2013.01); *F24F 2011/0064* (2013.01); *G05B 2219/2614* (2013.01); *Y02B 30/746* (2013.01)

(56) References Cited

U.S. PATENT DOCUMENTS

| | | | |
|---|---|---|---|
| 4,479,604 A | 10/1984 | Didner | |
| 4,635,445 A | 1/1987 | Otsuka et al. | |
| 4,890,666 A * | 1/1990 | Clark | F24F 11/0009 165/208 |
| 5,123,592 A | 6/1992 | Desmarais et al. | |
| 5,544,697 A | 8/1996 | Clark | |
| 5,863,246 A * | 1/1999 | Bujak, Jr. | F24F 3/0442 165/212 |
| 6,415,617 B1 | 7/2002 | Seem | |
| 6,719,625 B2 | 4/2004 | Federspiel | |
| 7,261,241 B2 | 8/2007 | Eoga | |
| 7,766,246 B2 | 8/2010 | Mulhouse et al. | |
| 7,890,215 B2 * | 2/2011 | Duncan | F24F 5/0035 62/179 |
| 2005/0005621 A1 * | 1/2005 | Jayadev | F24F 11/006 62/230 |
| 2007/0032187 A1 * | 2/2007 | Liu | F24F 11/0001 454/186 |
| 2008/0108295 A1 * | 5/2008 | Fischer | F24F 3/1423 454/239 |
| 2008/0264086 A1 * | 10/2008 | Liu | F24F 11/0079 62/180 |
| 2008/0277486 A1 | 11/2008 | Seem et al. | |
| 2009/0032236 A1 | 2/2009 | Geadelmann et al. | |
| 2009/0171512 A1 * | 7/2009 | Duncan | F24F 5/0035 700/300 |
| 2010/0307733 A1 | 12/2010 | Karamanos et al. | |
| 2011/0046790 A1 | 2/2011 | Miller et al. | |
| 2012/0132070 A1 * | 5/2012 | Matsuba | B01D 53/06 95/10 |
| 2013/0190899 A1 * | 7/2013 | Slessman | G05B 13/02 700/28 |
| 2013/0199772 A1 * | 8/2013 | Fischer | F28F 27/00 165/287 |

OTHER PUBLICATIONS

Chinese Office Action and Search Report for application CN 201380015391.8, dated Jul. 20, 2016, 7 pages.

* cited by examiner

COORDINATED AIR-SIDE CONTROL OF HVAC SYSTEM

CROSS-REFERENCE TO RELATED APPLICATIONS

This application claims priority to U.S. Provisional Patent Application Ser. No. 61/613,897, filed on Mar. 21, 2012, which is incorporated herein by reference in its entirety.

BACKGROUND

HVAC systems typically include an air handling unit (AHU) configured to provide fresh air to a facility via associated air ducts, and to remove air from the facility, thereby providing fresh air circulation. On the supply side, the AHU includes a heat exchange coil and a control valve, along with a supply air fan (SAF). The SAF pushes air across the coil and through a primary air (PA) casing, and to the facility. On the return side, the AHU includes a heat pump and a return air fan (RAF), which induces air to move from the facility to an exhaust. A heat recovery wheel may intersect both the return and supply sides and may cool and/or dehumidify the inlet air.

Some HVAC systems also include one or more chilled beams (CB). CBs are pipes or other structures filled with a chilled cooling medium, such as water, which courses therethrough. The CBs are typically hung from the ceiling of the facility, and supply air pushed from the AHU by the SAF is routed past the CBs by a CB fan. The CB fan speed and/or power state may be modulated to control the air temperature and/or $CO_2$ level in specific areas of the facility.

The SAF speed and supply air temperature (SAT) are typically controlled by comparing the pressure and temperature, respectively, in the PA casing to setpoints. The RAF control is linked to the SAF control, such that the RAF is configured to provide a percentage (e.g., 80%) of the volumetric flow rate produced by the SAF. The CB fan speed, on the other hand, is controlled by comparing the temperature and/or $CO_2$ level in the facility to setpoints, to maintain a desired temperature and avoid excessive $CO_2$ levels.

The SAF and CB fan controllers are typically controlled separately, at least from a conceptual standpoint, and often through separate hardware. However, the pressure in the PA casing often varies even when the CB fans are operating under reduced load, or are not on at all, for example, through natural ventilation. Accordingly, even when not required by the facility air temperature or $CO_2$ levels, the SAF (and thus RAF) continue to run for longer and/or at higher speeds than necessary, in an attempt to maintain the pressure in the PA casing at the setpoint.

What is needed is an apparatus and method for coordinating control of the SAF and CB fan to avoid unnecessary running of the SAF and/or RAF.

SUMMARY

Embodiments of the present disclosure may provide an exemplary method for linking control in an HVAC system. The method may include receiving a fan speed signal from a fan control loop, and choosing among an independent mode, a first linked mode, and a second linked mode, depending on the fan speed signal. The method may also include providing a signal to a pressure control loop to reduce a speed of a supply air fan of an AHU, when the first linked mode is chosen. The method may further include providing a signal to a temperature control loop to decrease a speed of a heat exchange wheel, to decrease a flow rate of a heat exchange fluid to an evaporator coil, or both, when the second linked mode is chosen. The method may additionally include allowing the fan control loop to operate independently of the temperature and pressure control loops, when the independent mode is chosen.

Embodiments of the disclosure may also provide an exemplary apparatus for controlling an HVAC system. The apparatus may include one or more fan control loops configured to control a speed of one or more chilled beam fans. The apparatus may also include a plant temperature control loop configured to control a speed of a supply air fan of an air handling unit, and a plant pressure control loop configured to control at least one of a speed of a heat exchange wheel of the air handling unit and a position of a control valve configured to control a flow rate of a refrigerant between a heat pump of the air handling unit and an evaporator coil of the air handling unit. The apparatus may further include a linking controller coupled to the one or more fan control loops, the plant temperature control loop and the plant pressure control loop. The linking controller may be configured to receive a signal from the one or more fan control loops indicative of the speed of the one or more chilled beam fans and choose among an independent mode, a first linked mode, and a second linked mode based on the speed of the one or more chilled beam fans. In the independent mode, the linking controller may allow the plant temperature control loop and the plant pressure control loop to operate independently from the one or more fan control loops. In the first linked mode, the linking controller may override the plant pressure control loop and cause the speed of the supply air fan to reduce to substantially zero. In the second linked mode, the linking controller may override the plant temperature control loop and cause at least one of the speed of the heat exchange wheel to reduce to substantially zero and the control valve to close or allow for a minimum flow rate.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
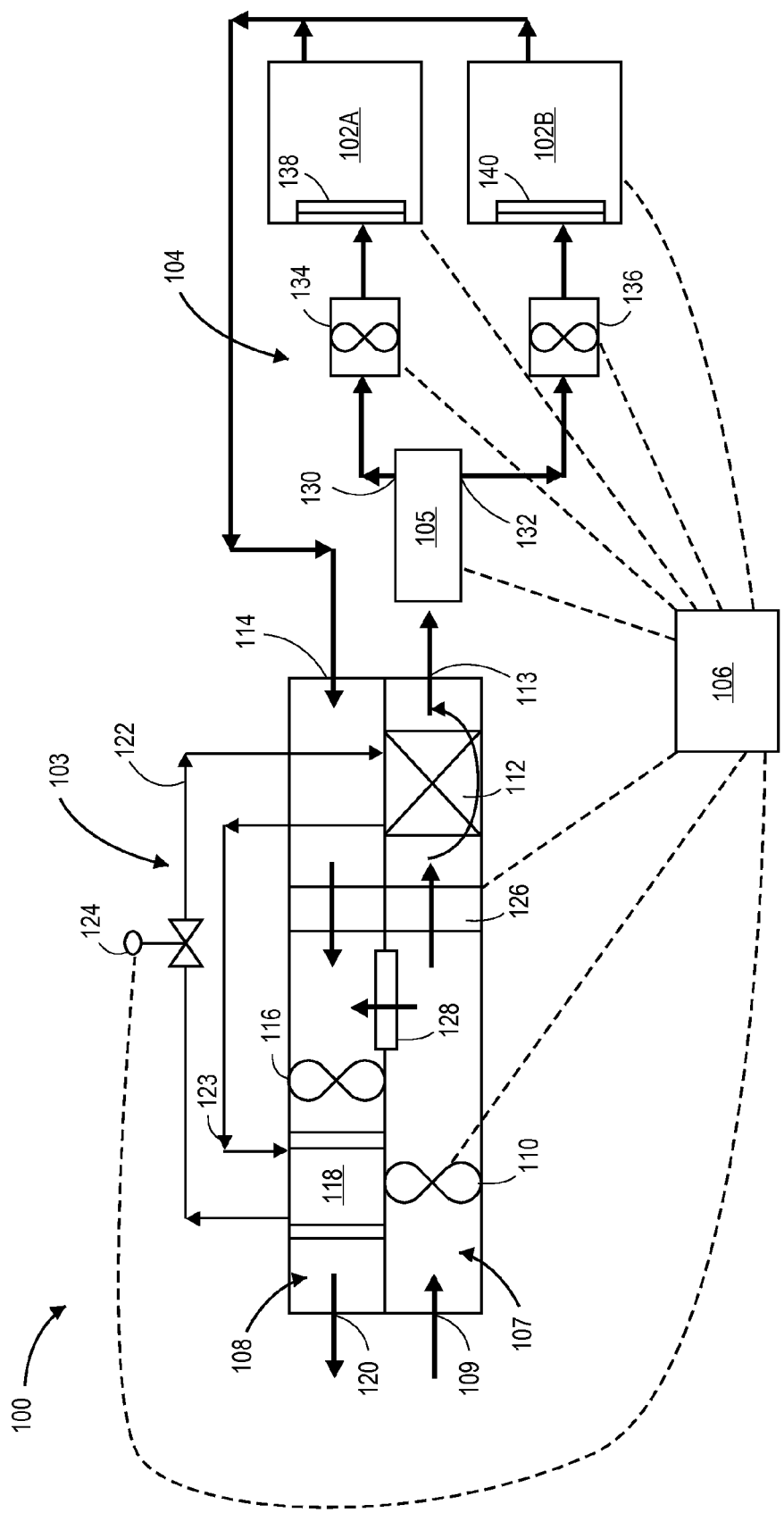
FIG. 1 illustrates a schematic view of an exemplary HVAC system, according to an embodiment.

FIG. 1 illustrates an exemplary HVAC system 100 configured to chill and/or otherwise condition one or more volumes 102a, 102b of air (e.g., rooms, areas, or other "zones" in a facility), according to an embodiment. The HVAC system 100 may include an air handling unit (AHU) 103 and a chilled beam (CB) subsystem 104, which are fluidly coupled together via a "primary air" (PA) casing 105.

The AHU 103 and CB subsystem 104 may be controlled in coordination by a controller 106. The controller 106 may be representative of one or more, for example, an array of programmable logic controllers and/or may be or include one or more multi-input-multi-output (MIMO) controllers. The controller 106 may be configured to receive inputs from the AHU 103, the CB subsystem 104, and/or the PA casing 105, so as to coordinate the operation thereof, thereby reducing overall energy consumption, as will be described in greater detail below.

The AHU 103 may be any suitable type of air handling system, and may include a supply side 107 through which fresh air is received, and a return side 108 through which air is exhausted. As shown, the supply side 107 and the return side 108 may be disposed in separate sections of a common housing, and oriented for counter-directional flow; however, in other embodiments, the supply and return sides 107, 108 may be otherwise oriented and/or disposed in separate housings. The supply side 107 may include an inlet 109, a supply air fan (SAF) 110 disposed downstream of the inlet 109, and a heat exchanger coil 112 disposed downstream of the SAF 110. The inlet 109 may be in communication with an ambient environment, and may include one or more ducts, headers, grates, dampers, filters, check valves, baffles, combinations thereof, or the like.

The SAF 110 may be any suitable type of fan and may include an electric motor to drive a plurality of blades or impellers via a suitable linkage. Accordingly, the SAF 110 may be an axial, radial, or centrifugal fan or blower, or a multiple unit or stage fan that may be a combination thereof. The heat exchanger coil 112 may be or include one or more copper, aluminum, or other thermally conductive coils or other heat exchanging structures. Accordingly, the heat exchanger coil 112 may serve as an evaporator to cool the air in the supply side 107.

The return side 108 of the AHU 103 may include an inlet 114, a return air fan (RAF) 116 disposed downstream of the inlet 114, a heat pump 118 disposed downstream of the RAF 116, and an exhaust outlet 120 disposed downstream of the heat pump 118. The inlet 114 may include one or more ducts, headers, grates, filters, dampers, check valves, baffles, combinations thereof, or the like and may be configured to receive spent air from the volumes 102a, 102b. The RAF 116 may be any suitable type of fan or blower, or multiple fans and/or blowers, and may include an electric motor to drive a plurality of blades or impellers. Accordingly, the RAF 116 may be an axial, radial, or centrifugal fan or blower, or a multiple unit or stage fan that may be a combination thereof.

The heat pump 118 may be fluidly coupled to the coil 112 via a supply line 122 and a return line 123. The heat pump 118 may be any suitable system configured to utilize warm exhaust air in the return side 108 to provide chilled heat transfer fluid to the coil 112. Suitable systems may include various implementations of the Rankine or other thermodynamic cycles and thus may include one or more compressors and/or pumps, expansion devices (e.g., expansion valves), and heat exchangers to recover heat from the exhaust air in the return side 108. Further, the heat pump 118 may use any suitable HCFC refrigerant, organic refrigerant, $CO_2$, or other fluid to serve as a heat transfer fluid between the heat pump 118 and the coil 112. The supply of chilled heat transfer fluid via line 122 may be at least partially controlled by modulation of a control valve 124, which may be disposed in the supply line 122.

The AHU 103 may also include a heat exchange wheel 126 configured to transfer heat from air in the supply side 107 to air in the return side 108. The heat exchange wheel 126 may be or include a heat or enthalpy recovery wheel. The heat exchange wheel 126 may be partially disposed in both the supply side 107 and the return side 108 and may be turned to rotate via an electric motor and an associated mechanical linkage. Accordingly, the heat exchange wheel 126 may absorb heat from the air in the supply side 107 and transfer it to the air in the return side 108, thereby precooling the air in the supply side 107 upstream from the coil 112. Although described as being or including a wheel, it will be appreciated that the heat exchange wheel 126 may instead or additionally include a shell-and-tube, plate-and-fin, printed circuit, or another type of heat exchanger, or may be omitted.

The AHU 103 may also include a damper 128, configured to allow air to transfer from the supply side 107 to the return side 108, for example, without traversing the coil 112 and/or the heat exchange wheel 126. This may allow the AHU 103 to avoid an excessive, positive pressure differential between the supply side 107 and the return side 108.

The PA casing 105 may be configured to receive chilled air from the supply side 107 of the AHU 103. The PA casing 105 may be any suitable air conduit, and may include one, two, three, or more outlets (two shown: 130, 132). In multiple outlet embodiments, as shown, the PA casing 105 may act as an air-distributing header. The number of outlets 130, 132 may correspond to, for example, equal, the number of volumes 102a, 102b to be chilled. However, in some embodiments, one or more of the outlets 130, 132 may supply air to two or more of the volumes 102a, 102b and/or one or more of the volumes 102a, 102b may receive air from two or more of the outlets 130, 132.

The CB subsystem 104 may include one or more CB fans (two shown: 134, 136), for example, one for each of the outlets 130, 132 of the PA casing 105 and/or one for each of the volumes 102a, 102b. The CB subsystem 104 may also include one or more CB arrays (two shown: 138, 140), for example, one for each of the CB fans 134, 136 and/or for each of the volumes 102a, 102b. Each CB array 138, 140 may include one or more chilled beams, which may be tubular, rectangular, elliptical, or any other suitable shape and may be configured to receive a chilled medium, for example, water, therein.

The controller 106 may be configured to receive an input from the PA casing 105, which may be indicative of the pressure and/or temperature, referred to as the "plant" temperature and "plant" pressure, respectively. The plant temperature may correspond to the temperature of the incoming air pushed out the outlet 113 of the supply side 107 of the AHU 103, which may also be referred to as the "supply air temperature" or SAT.

The plant pressure may be adjusted at least by adjusting the volumetric flow rate of the fresh air through the supply side 107. This may be accomplished by adjusting the speed of the SAF 110. Similarly, the SAT may be adjusted by varying the operating parameters of the AHU 103. For example, the SAT may be raised or lowered by modulating the control valve 124 position to control mass flow of chilled heat transfer fluid from the heat pump 118 to the coil 112. Additionally, the SAT may be adjusted by changing the speed of the heat exchange wheel 126, with a higher speed of the heat exchange wheel 126 allowing greater heat transfer and thus lower SAT. At least as shown, the controller 106 may be linked to one, some, or all of the inlet 109, the SAF 110, the control valve 124, and the heat exchange wheel 126, so as to change these operating parameters and thus adjust the SAT and/or plant pressure.

The controller 106 may also be coupled to one or more temperature sensors, $CO_2$ sensors, and/or other sensors disposed in or otherwise communicating with the volumes 102*a*, 102*b*. The controller 106 may signal the CB fans 134, 136 to adjust the temperature and/or $CO_2$ levels in the volumes 102*a*, 102*b* in response to such input by comparing the measured temperature and/or $CO_2$ level to one or more setpoints. For example, the speed of the CB fans 134, 136 may be increased to reduce temperature and/or reduce $CO_2$ levels.

Figure 2:
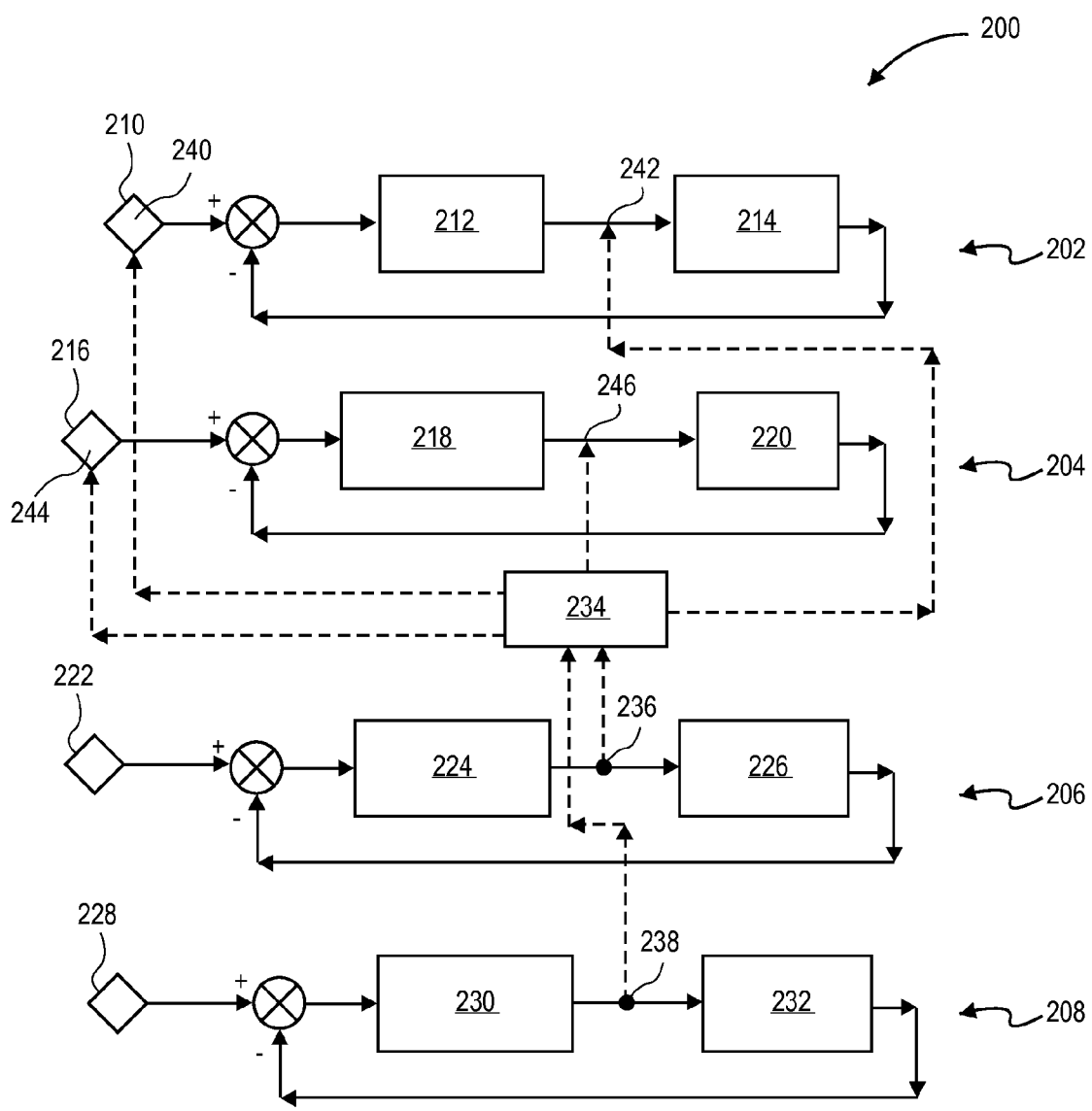
FIG. 2 illustrates a schematic view of an exemplary coordinated control scheme for an HVAC system, according to an embodiment.

FIG. 2 schematically illustrates an exemplary embodiment of a coordinated control scheme 200 for an HVAC system, such as the HVAC system 100 shown in and described above with reference to FIG. 1. The control scheme 200 includes a plurality of control loops, for example, four control loops 202, 204, 206, and 208, as shown. The first control loop 202 may be a plant pressure control loop, configured to regulate the air pressure in the PA casing. The second control loop 204 may be a supply air temperature control loop, configured to control the air temperature in the PA casing. The third control loop 206 may be a first CB fan control loop and the fourth control loop 208 may be a second CB fan control loop, with both the CB fan control loops 206, 208 being configured to control CB fan 134, 136 speed. It will be appreciated that additional CB fan control loops may be provided in HVAC systems employing more than two CB fans.

The first control loop 202 may include a pressure setpoint module 210, which may be a module for calculating, determining, inputting, or otherwise providing the optimal pressure setpoint to the first control loop 202. The first control loop 202 may also include a pressure controller 212. The pressure controller 212 may be, include, or be a part of any suitable type of programmable logic controller. Additionally, the first control loop 202 may include a plant pressure sensor 214, which measures, senses, or otherwise provides the pressure in the PA casing 105 to the first control loop 202.

The second control loop 204 may include a SAT setpoint module 216, which may be a module for calculating, determining, inputting, or otherwise providing the optimal SAT setpoint to the second control loop 204. The second control loop 204 may also include a temperature controller 218. The temperature controller 218 may be or be a part of any suitable type of programmable logic controller. Additionally, the second control loop 204 may include a plant SAT sensor 220, which measures, senses, or otherwise provides the temperature in the PA casing 105 (i.e., the SAT) to the second control loop 204.

The third control loop 206 may include a first zone setpoint module 222, which may be a module for calculating, determining, inputting, or otherwise providing the optimal temperature and/or $CO_2$ level setpoint to the third control loop 206. The third control loop 206 may also include a first temperature/$CO_2$ controller 224. The first temperature/$CO_2$ controller 224 may be, include, or be a part of any suitable type of programmable logic controller. Additionally, the third control loop 206 may include a first temperature/$CO_2$ sensor 226, which measures, senses, or otherwise provides the temperature and/or $CO_2$ levels in a particular volume (e.g., volume 102*a*) to the third control loop 206.

The fourth control loop 208 may include a second zone setpoint module 228, which may be a module for calculating, determining, inputting, or otherwise providing the optimal temperature and/or $CO_2$ level setpoint to the fourth control loop 208. The fourth control loop 208 may also include a second temperature/$CO_2$ controller 230. The second temperature/$CO_2$ controller 230 may be, include, or be a part of any suitable type of programmable logic controller. Additionally, the fourth control loop 208 may include a second temperature/$CO_2$ sensor 232, which measures, senses, or otherwise provides the temperature and/or $CO_2$ levels in a particular volume (e.g., volume 102*b*) to the fourth control loop 208.

The control scheme 200 may also include a linking controller 234 configured to increase efficiency by linking the operation of the one, some, or all of the control loops 202, 204, 206, 208 (or more). The linking controller 234 may be, include, or be a part of any suitable programmable logic controller. Further, the linking controller 234 may include multiple controllers linked together to provide multiple-input-multiple-output operation, or may include a single MIMO controller. Furthermore, it will be appreciated that the controllers 212, 218, 224, 230, and/or 234 may all be supplied as part of one, two, three, four, five, or more discrete programmable logic controllers (PLCs), or two or more of the controllers 212, 218, 224, 230, and/or 234 may be combined into a single PLC, which provides the functionality of the two or more controllers either in parallel or sequentially.

In an exemplary embodiment, the linking controller 234 may be coupled to the third and fourth control loops 206, 208 at points 236, 238 and, for example, configured to receive an output signal from the CB controllers 224, 230. The linking controller 234 may also be coupled to the first and second control loops 202, 204 in at least one position, for example, at points 240 and 242 and points 244 and 246, respectively, and may be configured to provide one or more signals thereto. For example, the points 240, 244 may be between the setpoint modules 210, 216 and the controllers 212, 218, respectively. The linking controller 234 may be configured to provide signals to the points 240, 242 and thereby alter the signal from the setpoint modules 210, 216 or may alter the setpoint modules 210, 216 themselves.

The points 242, 246 may be positioned in the first and second control loops 202, 204, respectively, between the controllers 212, 218 and the sensors 214, 220, respectively. The linking controller 234 may be configured to provide signals to the first and second control loops 202, 204 at the points 242, 246, to alter the output of the controllers 212, 218 and/or to alter the parameters or functions applied by the controllers 212, 218. It will be appreciated that the location of the points 236-246 is intended to be conceptual, rather than structural, unless otherwise expressly indicated herein.

The linking controller 234 may provide for at least two operational modes for the control scheme 200, referred to herein for purposes of illustration as an "independent" mode and one or more (e.g., first and second) "linked" modes. During each of the modes, the linking controller 234 may be configured to receive information from the third and fourth control loops 206, 208, so as to monitor the fan speed prescribed for the CB fans 134, 136. Additional modes may also be provided in which the linking controller 234 does not monitor the signaled speed for the CB fans 134, 136, such as a standby or off mode, in which the linking controller 234 is off or otherwise not receiving information.

When the linking controller 234 registers that the speed to the CB fans 134, 136 is indicative of normal loads (i.e., that the CB fans are running for normal use), the linking controller 234 may be in independent mode, allowing the four control loops 202, 204, 206, 206 to proceed by operating independently of one another. Accordingly, each of the setpoint modules 210, 216, 222, 228 provides a setpoint in the respective control loop 202, 204, 206, 208. This value is compared against a signal from the relevant sensor 214, 220, 226, 232 to generate an error signal, which is passed to the respective controller 212, 218, 224, 230. Using control logic and/or analytically determined process constants (e.g., delay time, time constant, damping ratio, etc.), the controllers 212, 218, 224, and 230 generate a resultant signal.

For the first control loop 202, the resultant signal may be the SAF 110 speed. In the second control loop 204, the resultant signal may be the heat exchange wheel 126 speed and/or the position for the control valve 124. In the third control loop 206, the resultant signal may be the CB fan 134 speed. In the fourth control loop 208, the resultant signal may be the second CB fan 136 speed. These signals are then routed to the associated component of the HVAC system 100 and, thus, alter the conditions in the PA casing 105 and/or in one or more volumes 102a, 102b. The sensors 214, 220, 226, 232 register the changed conditions and relay them back for comparison with the setpoint, thereby closing the loop on the control loops 202, 204, 206, 208.

When the linking controller 234 registers that both (or, if additional CB fans and control loops are provided, most or all) of the controllers 224, 230 are signaling the associated CB fans 134, 136 to have a zero speed, the linking controller 234 may switch to the first linked mode. In first linked mode, the linking controller 234 may override the controllers 212, 218, providing a signal which causes the SAF 110 and/or the heat exchange wheel 126 to have a zero or idle speed, and/or cause the control valve 124 to close or move to a minimum flow position.

The linking controller 234 may accomplish the override in at least one of two ways shown in FIG. 2, although other ways to override the controllers 212, 218 will be readily apparent to one with skill in the art and may be employed without departing from the scope of the present disclosure. For example, the linking controller 234 may directly adjust the signal to the SAF 110, the heat exchange wheel 126, and/or the control valve 124, for example, by providing a signal to points 242, 246 to alter the output of the controller 212, 218. In another example, the linking controller 234 may alter the setpoints and thus change the error signal received by the controllers 212, 218. The error signal will then indicate to the controllers 212, 218 that a zero (or closed, in the case of the control valve 124) is needed, and the controller 212, 218 will provide the altered signal to the appropriate component(s).

In an embodiment, the linking controller 234 may change the pressure setpoint in the first control loop 202 to a negative value, for example, between about −20 Pa and about −1 Pa, or about −5 Pa. The controller 212 receives this signal, indicating that plant pressure needs to be reduced, and therefore turns off the SAF 110 or otherwise signals its speed to be zero or substantially zero (e.g., idle). Similarly, the linking controller 234 may change the temperature setpoint in the second control loop 204 to a very low value (e.g., below absolute zero or well below expected temperatures) such that the controller 218 reads that no additional cooling is required and therefore turns the speed of the heat exchange wheel 126 to zero or idle and signals the control valve 124 to move to a closed or minimum flow position.

If during the first linked mode, one of the CB controllers 224, 230 begins signaling to the CB fan 134, 136 to move to a non-zero speed, but relatively low speed (i.e., above a "first" threshold speed) the linking controller 234 may move into the second linked mode. For example, the second threshold speed may be between about 1% and about 25%, between about 5% and about 20%, between about 7% and about 15%, or about 10% of the of the maximum speed of the CB fan 134, 136. As the term is used herein, "maximum speed" is generally defined to mean the maximum speed at which the fan is intended to run. Accordingly, it may refer to the maximum rated speed, or a setting provided, e.g., in the controller 106 and/or 224, 230, during installation, maintenance, or another time during the life of the fan and/or the HVAC system 100.

In the second linked mode, no pressure override may be required and, accordingly, the linking controller 234 may end communication with the first control loop 202, allowing the first controller 212 to resume independent control of the SAF 110 speed. The SAT, however, may not need to be set nearly as or as low as is during independent mode, as the CB fan(s) 134, 136 may be operating under low-load.

Accordingly, the linking controller 234 may override the controller 218 to provide an altered signal to the heat exchange wheel 126 and/or the control valve 124. Again, the signal may be sent to point 244 and/or to point 246, to either alter the setpoint so that the controller 218 provides the altered signal, or may directly override the controller 218 signal by sending a signal to point 246.

In an embodiment, in the second linked mode, the linking controller 234 may alter the setpoint to be either above or below a dew point, depending on what the dew point is. For example, the second linking controller 234 may have a threshold dew point temperature, such that if the actual dew point temperature is above the threshold, the second linking controller 234 overrides the second control loop 204 to adjust the SAT setpoint to be below the threshold. Further to this example, if the actual dew point is above the threshold, the linking controller 234 may override the second control loop 204 to adjust the SAT setpoint to be above the threshold.

In one specific embodiment, the dew point threshold may be about 16° C. If the dew point temperature is greater than about 16° C., the linking controller 234 may override the controller 218 such that the second control loop 204 operates the heat exchange wheel 126 and/or control valve 124 to set the SAT at about 16° C. On the other hand, if the dew point temperature is less than or equal to about 16° C., the linking controller 234 may override the controller 218 such that the second control loop 204 operates the heat exchange wheel 126 and/or control valve 124 to set the SAT at about 18° C. It will be readily appreciated that these temperature values are merely exemplary and could be substituted with any other suitable dew point thresholds and/or SAT setpoint temperatures.

Additionally, when the linking controller 234 registers that the controllers 224, 230 are signaling the CB fans 134, 136 to exceed a minimum speed (i.e., a "second" threshold), the linking controller 234 may end its override of one or both of the first and second control loops 202, 204, thereby returning to independent mode. In various exemplary embodiments, the linking controller 234 may receive the speed signal to the CB fans 134, 136 and take an average (either weighted or not) and compare the average to the minimum CB fan 134, 136 speed. The second threshold, that is, the minimum CB fan 134, 136 speed for returning to independent mode, may be, for example, between about 10% and about 30%, between about 15% and about 25%, or about 20% of the maximum operating speed of the CB fans 134, 136. In some instances, the setpoints of the setpoint modules 210, 216 may need to be updated to return to independent mode. In such case, one or more hysteresis algorithms may be employed to arrive at the optimal setpoint or, in other embodiments, a default setpoint may be used and subsequently altered by the respective control loop 202, 204.

It will be appreciated that, in various embodiments, the above-described control logic for the coordinated control scheme 200 may provide a variety of benefits for the HVAC system 100. For example, the SAF 110, RAF 116, the heat exchange wheel 126, and the control valve 124 may be stopped/closed when there is no need for fresh air in the volumes 102a, 102b. Furthermore, the SAT setpoints may be higher when there is a low load (i.e., the average CB fan 134, 136 speed is low).

Additionally, it will be appreciated that the coordinated control scheme 200 may readily be applied to other type of configurations: for example, AHU and fan-coil unit (FCU) combinations. In this alternative configuration, the third and fourth control loops 206, 208, which were described as controlling the CB fan 134, 136 speed, are instead representative of control loops for FCU fan speed. If the fans of FCUs are detected to be shut down, the linking controller 234 may enter first linked mode, as described above, thereby shutting down/closing the SAF 110, the heat exchange wheel 126, and/or the control valve 124. Similarly, in the second linked mode, the SAT setpoint is set to be higher when the fans of all FCUs are detected to be at a low speed (e.g., above zero but below a minimum).

Figure 3:
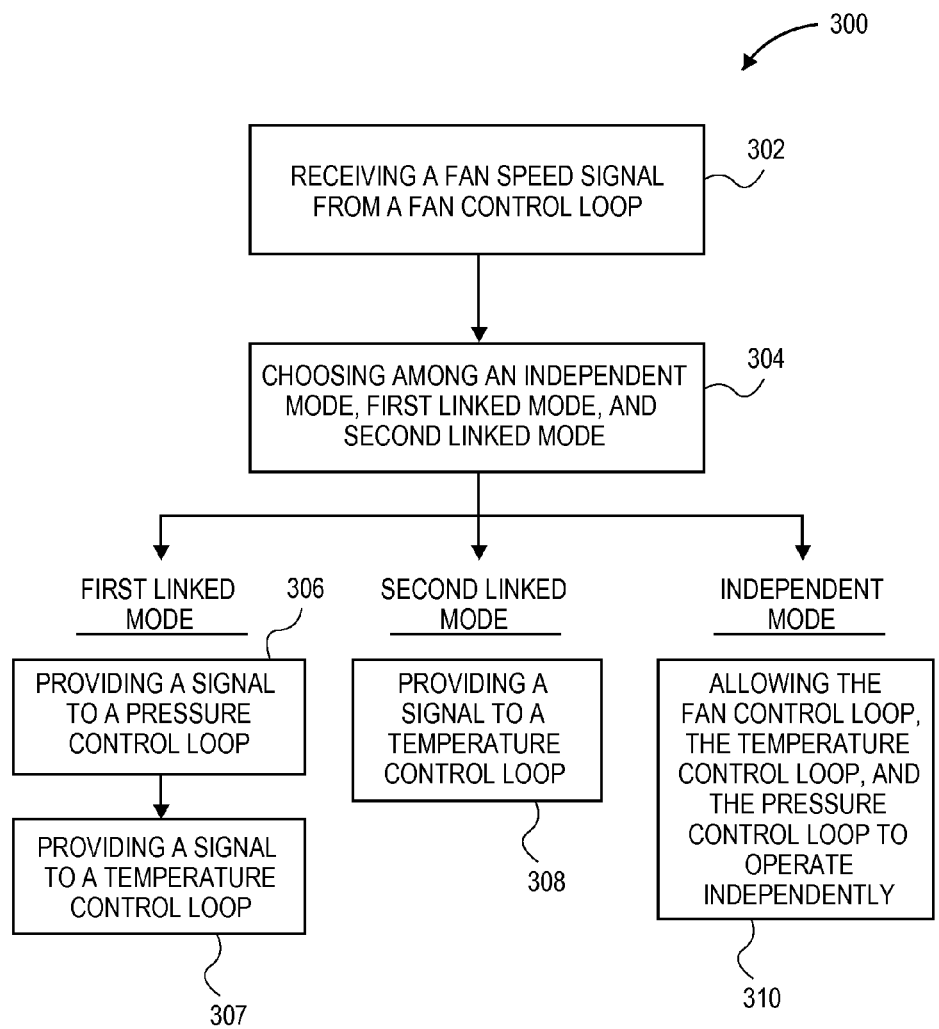
FIG. 3 illustrates a flowchart of an exemplary method for controlling an HVAC system, according to an embodiment.

FIG. 3 illustrates a flowchart of a method 300 for linking control in an HVAC system, according to an embodiment. The method 300 may proceed by implementing the control scheme 200, for example, using the linking controller 234 in the controller 106 of the HVAC system 100. Accordingly, the method 300 may be best understood with reference to the above description of the HVAC system 100 and control scheme 200 of FIGS. 1 and 2, respectively.

The method 300 may include receiving a fan speed signal from a fan control loop, as at 302. The method 300 may then proceed to choosing among an independent mode, a first linked mode, and a second linked mode, depending on the fan speed signal, as at 304. Such choosing may employ the linking controller 234, in at least one embodiment.

When the first linked mode is chosen, the method 300 may include providing a signal to a pressure control loop to reduce a speed of a supply air fan of an air handling unit, as at 306. The method 300 may also include providing a signal to the temperature control loop to decrease the speed of the heat exchange wheel, to decrease the flow rate of the heat exchange fluid, or both, when the first linked mode is chosen, as at 307. In the second linked mode, the method 300 may include providing a signal to the temperature control loop to decrease a speed of a heat exchange wheel, to decrease a flow rate of the heat exchange fluid to the evaporator coil, or both, as at 308. In the independent mode, the method 300 may include allowing the fan control loop to operate independently of the temperature and pressure control loops, when the independent mode is chosen, as at 310.

As shown, the choosing at 304 may lead to any of the three modes shown at 306, 308, 310. Additional modes may also be made available for choosing at 304, or elsewhere, without departing from the scope of the present disclosure. Furthermore, the method 300 may be iterative, such that any one of the three modes may be chosen, and then subsequently another mode be chosen in the next iteration.

Additionally, in an embodiment, providing the signal to the pressure control loop when the first linked mode is chosen, as at 306, may include signaling the pressure control loop to decrease the speed of the supply air fan to substantially zero. Further, providing the signal to the temperature control loop when the first linked mode is chosen, as at 307, may include signaling the temperature control loop to power off the heat exchange wheel, close a control valve configured to control the flow rate of the heat exchange fluid, or both.

Furthermore, providing the signal to the temperature control loop when the second linked mode is chosen, as at 308, may include signaling the temperature control loop to adjust a supply air temperature setpoint according to a dew point and a dew point threshold. Such adjustment may include setting the supply air temperature setpoint to a first value that is above the dew point, when the dew point is below or equal to the threshold, and setting the supply air temperature setpoint to a second value that is below the dew point, when the dew point is greater than the threshold.

Additionally, choosing among the independent mode, the first linked mode, and the second linked mode, as at 304, may include choosing the first linked mode when the fan speed is below a first threshold, choosing the second linked mode when the fan speed is between the first threshold and a second threshold, and choosing the third linked mode when the fan speed is above the second threshold. For example, the first threshold may be between about 1% and about 25% of a maximum speed of the fan. Further, the second threshold may be between about 10% and about 30% of the maximum speed of the fan.

In some embodiments, providing the signal to the temperature control loop comprises in the second linked mode, as at 308, may include altering a setpoint signal, an error signal, or both of the temperature control loop. Additionally or alternative, such signaling may include altering a control signal produced by a controller of the temperature control loop. Similarly, providing the signal to the pressure control loop, as at 308, may include altering a setpoint signal, an error signal, or both of the pressure control loop, and/or altering a control signal produced by a controller of the pressure control loop.

Moreover, the method 300 may further include receiving one or more additional fan speed signals from one or more additional fan speed control loops. In such case, choosing among the independent mode, first linked mode, or second linked mode may proceed by and/or include averaging the fan speed signal and each of the one or more additional fan speed signals (i.e., the fan speed indicated by the fan speed signal, plus the fan speed indicated by each additional fan speed signals, divided by the total number of fan speed signals).

In various embodiments, the fan speed control loop may be configured to control a speed of a chilled beam fan. Additionally or alternatively, the fan speed control loop may be configured to control a fan of a fan coil unit.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages may be added or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface being on the top surface of the workpiece, regardless of the orientation of the workpiece.

What is claimed is:

1. A method for linking control in an heating ventilation and air conditioning (HVAC) system, comprising: receiving a fan speed signal from a fan control loop;
    choosing among an independent mode, a first linked mode, and a second linked mode, depending on the fan speed signal;
    providing a signal to a pressure control loop to reduce a speed of a supply air fan of an air handling unit, when the first linked mode is chosen;
    providing a signal to a temperature control loop to decrease a speed of a heat exchange wheel, to decrease a flow rate of a heat exchange fluid to an evaporator coil, or both, when the second linked mode is chosen; and
    allowing the fan control loop to operate independently of the temperature and pressure control loops, when the independent mode is chosen.

2. The method of claim 1, wherein providing the signal to the pressure control loop when the first linked mode is chosen comprises signaling the pressure control loop to decrease the speed of the supply air fan to substantially zero.

3. The method of claim 1, further comprising providing a signal to the temperature control loop to decrease the speed of the heat exchange wheel, to decrease the flow rate of the heat exchange fluid, or both, when the first linked mode is chosen.

4. The method of claim 3, wherein providing the signal to the temperature control loop when the first linked mode is chosen comprises signaling the temperature control loop to power off the heat exchange wheel, close a control valve configured to control the flow rate of the heat exchange fluid, or both.

5. The method of claim 1, wherein providing the signal to the temperature control loop when the second linked mode is chosen comprises signaling the temperature control loop to adjust a supply air temperature according to a dew point and a dew point threshold.

6. The method of claim 5, wherein signaling the temperature control loop to adjust the supply air temperature according to a dew point and a dew point threshold comprises:
    setting a supply air temperature setpoint to a first value that is above the dew point, when the dew point is below or equal to the threshold; and
    setting a supply air temperature setpoint to a second value that is below the dew point, when the dew point is greater than the threshold.

7. The method of claim 1, wherein choosing among the independent mode, the first linked mode, and the second linked mode comprises:
    choosing the first linked mode when the fan speed is below a first threshold;
    choosing the second linked mode when the fan speed is between the first threshold and a second threshold; and
    choosing the third linked mode when the fan speed is above the second threshold.

8. The method of claim 7, wherein the first threshold is between about 1% and about 25% of a maximum speed of the fan.

9. The method of claim 8, wherein the second threshold is between about 10% and about 30% of the maximum speed of the fan.

10. The method of claim 1, wherein providing the signal to the temperature control loop comprises altering a setpoint signal, an error signal, or both of the temperature control loop.

11. The method of claim 1, wherein providing the signal to the temperature control loop comprises altering a control signal produced by a controller of the temperature control loop.

12. The method of claim 1, wherein providing the signal to the pressure control loop comprises altering a setpoint signal, error signal, or both of the pressure control loop.

13. The method of claim 1, wherein providing the signal to the pressure control loop comprises altering a control signal produced by a controller of the pressure control loop.

14. The method of claim 1, further comprising receiving one or more additional fan speed signals from one or more additional fan speed control loops, wherein choosing among the independent mode, the first linked mode, or the second linked mode comprises averaging the fan speed signal and each of the one or more additional fan speed signals.

15. The method of claim 1, wherein the fan speed control loop is configured to control a speed of a chilled beam fan.

16. The method of claim 1, wherein the fan speed control loop is configured to control a speed of at least one fan of a fan coil unit.

17. An apparatus for controlling an heating ventilation and air conditioning (HVAC) system, comprising:

one or more fan control loops each configured to control a speed of one or more chilled beam fans;

a plant temperature control loop configured to control a speed of a supply air fan of an air handling unit;

a plant pressure control loop configured to control at least one of a speed of a heat exchange wheel of the air handling unit and a position of a control valve configured to control a flow rate of a refrigerant between a heat pump of the air handling unit and an evaporator coil of the air handling unit; and a linking controller coupled to the one or more fan control loops, the plant temperature control loop, and the plant pressure control loop, the linking controller being configured to receive a signal from the one or more fan control loops indicative of the speed of the one or more chilled beam fans and to choose among an independent mode, a first linked mode, and a second linked mode based on the speed of the one or more chilled beam fans, wherein, in the independent mode, the linking controller allows the plant temperature control loop and the plant pressure control loop to operate independently from the one or more fan control loops, in the first linked mode, the linking controller overrides the plant pressure control loop and causes the speed of the supply air fan to reduce to substantially zero, and in the second linked mode, the linking controller overrides the plant temperature control loop and causes at least one of the speed of the heat exchange wheel to reduce to substantially zero and the control valve to close or allow for a minimum flow rate.

18. The apparatus of claim 17, wherein, in the first linked mode, the linking controller is configured to override the plant temperature control loop and cause at least one of the speed of the heat exchange wheel to reduce to substantially zero and the control valve to close or allow for a minimum flow rate.

19. The apparatus of claim 17, wherein the linking controller is configured to choose the first linked mode when the speed of the chilled beam fan is below a first threshold, to choose the second linked mode when the speed of the chilled beam fan is above the first threshold but less than a second threshold, and to choose the independent mode when the speed of the chilled beam fan is above the second threshold.

20. The apparatus of claim 17, wherein:

at least one of the one or more fan control loops includes a controller and a sensor coupled together, the linking controller being coupled to the fan control loop between the controller and the sensor;

the plant temperature control loop includes a setpoint module, a controller, and a sensor, the linking controller being coupled to the plant temperature control loop at the setpoint module, between the controller and the sensor, or both; and the plant pressure control loop includes a setpoint module, a controller, and a sensor, the linking controller being coupled to the plant temperature control loop at least at the setpoint module, between the controller and the sensor, or both.

* * * * *